United States Patent [19]
Westerberg

[11] Patent Number: 6,011,242
[45] Date of Patent: *Jan. 4, 2000

[54] METHOD AND APPARATUS OF COOKING FOOD IN A LIGHTWAVE OVEN

[75] Inventor: Eugene R. Westerberg, Palo Alto, Calif.

[73] Assignee: Quadlux, Inc., Fremont, Calif.

[ * ] Notice: This patent is subject to a terminal disclaimer.

[21] Appl. No.: 08/924,160

[22] Filed: Sep. 5, 1997

Related U.S. Application Data

[63] Continuation-in-part of application No. 08/146,415, Nov. 1, 1993, Pat. No. 5,666,259.

[51] Int. Cl.[7] .............................. H05B 1/02; A21B 1/40
[52] U.S. Cl. ......................... 219/411; 219/412; 219/486; 426/248
[58] Field of Search ..................................... 219/411, 405, 219/412–414, 492, 486, 509, 485; 392/416, 418; 426/523, 241, 243, 248, 465–466, 496; 99/326, 325, 331, 451

[56] References Cited

U.S. PATENT DOCUMENTS

| | | |
|---|---|---|
| 2,559,249 | 7/1951 | Hudson . |
| 2,864,932 | 12/1958 | Forrer . |
| 3,033,968 | 5/1962 | Julie ......................................... 219/492 |

(List continued on next page.)

FOREIGN PATENT DOCUMENTS

| | | |
|---|---|---|
| 0 023 724 | 2/1981 | European Pat. Off. . |
| 0215617 | 9/1986 | European Pat. Off. . |
| 25 46 106 | 4/1977 | Germany . |
| 35 03 648 | 4/1986 | Germany . |
| 57-60007 | 4/1982 | Japan . |
| 57-70323 | 4/1982 | Japan . |
| 59-210228 | 11/1984 | Japan . |
| 60-37116 | 2/1985 | Japan . |
| 60-69920 | 5/1985 | Japan . |
| 60-167932 | 11/1985 | Japan . |
| 60-245933 | 12/1985 | Japan . |
| 63-34913 | 3/1988 | Japan . |
| 63-49405 | 4/1988 | Japan . |
| 1-154483 | 6/1989 | Japan . |
| 315982 | 12/1989 | Japan . |
| 4080523 | 3/1992 | Japan . |
| 361714 | 12/1992 | Japan . |

(List continued on next page.)

OTHER PUBLICATIONS

Fostoria Corp., "Heat Processing with Infrared," Feb. 1962, pp. 1–7.

Summer, W. Dr., "Ultra–Violet and Infra–Red Engineering," 1962, pp. 102–112.

Beggs, E.W., "Quicker Drying With Lamps," Jul. 1939, vol. 97, No. 7, pp. 88–89.

Harold McGee, Book, "On Food and Cooking," Charles Schribner's Sons, New York, 1984, Chapter 14, pp. 608–624.

*Primary Examiner*—John A. Jeffery
*Attorney, Agent, or Firm*—Limbach & Limbach L.L.P.

[57] ABSTRACT

A lightwave oven cooking method and apparatus uses pulsed power applied to a plurality of high-power lamps which provides radiant energy in the electromagnetic spectrum and having wavelengths including the visible and near-visible ranges. Irradiation is applied to the food by applying power to the lamps for a specified period of time without vaporizing all of the surface water on the food, and then applying reduced irradiation to the food to complete the cooking cycle without producing an overly browned surface which inhibits deep penetration of radiation in the near-visible and visible ranges. The reduced power can be at a reduced duty cycle which can be done in a sequence of one or more reducing steps in the duty cycle or a continuous reduction of the duty cycle of the power applied to the lamps. A change in color, in water vapor concentration emitted from the surface, in the food temperatures and/or in the generation of steam to a predetermined degree can be sensed to reduce power.

13 Claims, 8 Drawing Sheets

U.S. PATENT DOCUMENTS

| | | | |
|---|---|---|---|
| 3,037,443 | 6/1962 | Newkirk et al. | 99/332 |
| 3,249,741 | 5/1966 | Mills | 219/388 |
| 3,304,406 | 2/1967 | King | 219/411 |
| 3,313,917 | 4/1967 | Ditzler et al. | 219/400 |
| 3,342,977 | 9/1967 | Anderson | 219/548 |
| 3,448,678 | 6/1969 | Burstein | 99/386 |
| 3,470,942 | 10/1969 | Fukada et al. | 219/492 |
| 3,569,656 | 3/1971 | White et al. . | |
| 3,621,200 | 11/1971 | Watts, Jr. . | |
| 3,666,921 | 5/1972 | Shevlin | 219/492 |
| 3,688,084 | 8/1972 | Charneski | 219/537 |
| 3,719,789 | 3/1973 | Harnden, Jr. . | |
| 3,828,163 | 8/1974 | Amagami et al. | 219/413 |
| 3,870,806 | 3/1975 | Capossela et al. | 426/221 |
| 3,935,807 | 2/1976 | Main et al. | 99/352 |
| 3,944,807 | 3/1976 | Frantti et al. . | |
| 3,959,620 | 5/1976 | Stephen, Jr. | 219/386 |
| 4,164,591 | 8/1979 | Ahlgren et al. | 426/523 |
| 4,238,995 | 12/1980 | Polster | 219/411 |
| 4,244,284 | 1/1981 | Flavan, Jr. et al. | 99/327 |
| 4,245,148 | 1/1981 | Gisske et al. | 219/492 |
| 4,360,726 | 11/1982 | Haden | 219/494 |
| 4,374,319 | 2/1983 | Guibert | 219/400 |
| 4,379,964 | 4/1983 | Kanazawa et al. | 219/492 |
| 4,396,817 | 8/1983 | Eck et al. | 426/523 |
| 4,401,884 | 8/1983 | Kusunoki et al. | 426/243 |
| 4,410,779 | 10/1983 | Weiss . | |
| 4,421,974 | 12/1983 | Oota et al. | 219/492 |
| 4,441,015 | 4/1984 | Eichelberger et al. | 219/411 |
| 4,463,238 | 7/1984 | Tanabe . | |
| 4,481,405 | 11/1984 | Malick | 219/405 |
| 4,483,631 | 11/1984 | Kydd | 364/557 |
| 4,486,639 | 12/1984 | Mittelsteadt . | |
| 4,493,960 | 1/1985 | Mittelsteadt et al. . | |
| 4,516,486 | 5/1985 | Burkhart | 99/388 |
| 4,554,437 | 11/1985 | Wagner et al. | 219/388 |
| 4,565,704 | 1/1986 | Dagerskog et al. | 426/233 |
| 4,575,616 | 3/1986 | Bergendal | 219/405 |
| 4,680,451 | 7/1987 | Gat et al. | 219/411 |
| 4,687,895 | 8/1987 | Chitre et al. . | |
| 4,700,051 | 10/1987 | Goessler et al. | 219/464 |
| 4,731,251 | 3/1988 | Jovanovic | 426/243 |
| 4,761,529 | 8/1988 | Tsisios . | |
| 4,771,154 | 9/1988 | Bell et al. | 219/405 |
| 4,894,518 | 1/1990 | Ishikawa | 219/413 |
| 4,960,977 | 10/1990 | Alden | 219/411 |
| 5,034,235 | 7/1991 | Dunn et al. | 426/238 |
| 5,039,535 | 8/1991 | Lang et al. | 426/523 |
| 5,164,161 | 11/1992 | Feathers et al. | 422/109 |
| 5,182,439 | 1/1993 | Burkett et al. | 219/492 |
| 5,317,130 | 5/1994 | Burkett et al. | 219/492 |
| 5,319,171 | 6/1994 | Tazawa | 219/705 |
| 5,352,865 | 10/1994 | Burkett et al. | 219/492 |
| 5,378,872 | 1/1995 | Jovanovic | 219/405 |
| 5,382,441 | 1/1995 | Lentz et al. | 436/411 |
| 5,396,047 | 3/1995 | Schilling et al. . | |
| 5,422,460 | 6/1995 | Bralia et al. . | |
| 5,478,986 | 12/1995 | Westerberg | 219/411 |
| 5,517,005 | 5/1996 | Westerberg | 219/405 |
| 5,567,459 | 10/1996 | Gonzalez-Hernandez et al. | 426/241 |
| 5,665,259 | 9/1997 | Westerberg | 219/411 |
| 5,695,668 | 12/1997 | Boddy | 219/400 |
| 5,695,669 | 12/1997 | Westerberg | 219/411 |
| 5,712,464 | 1/1998 | Westerberg | 219/411 |
| 5,726,423 | 3/1998 | Westerberg et al. | 219/411 |
| 5,736,713 | 4/1998 | Westerberg | 219/411 |
| 5,786,569 | 7/1998 | Westerberg | 219/411 |
| 5,883,362 | 3/1999 | Pettibone et al. | 219/411 |

FOREIGN PATENT DOCUMENTS

| | | |
|---|---|---|
| 59-47302 | 3/1994 | Japan . |
| 569419 | 11/1975 | Switzerland . |
| 1215651 | 3/1986 | U.S.S.R. . |
| 1273023 | 5/0000 | United Kingdom . |
| 839551 | 6/1960 | United Kingdom . |
| 2132060 | 8/1983 | United Kingdom . |
| 1273023 | 6/1984 | United Kingdom . |
| 2152790 | 8/1985 | United Kingdom . |
| 2245136 | 1/1992 | United Kingdom . |
| 95 12962 | 5/1995 | WIPO . |

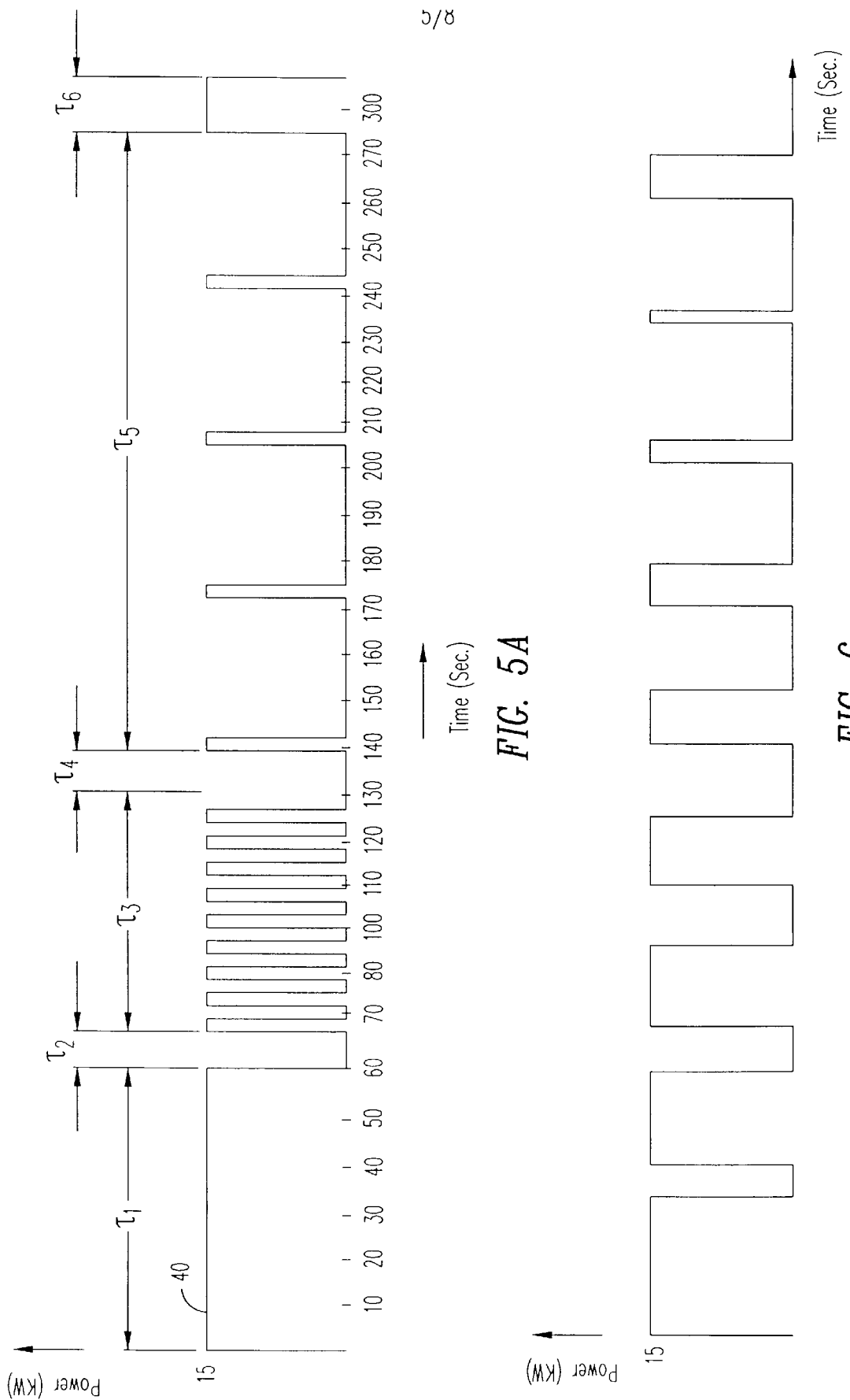

METHOD AND APPARATUS OF COOKING FOOD IN A LIGHTWAVE OVEN

CROSS REFERENCES TO RELATED APPLICATIONS

This application is a continuation-in-part of U.S. patent application Ser. No. 146,415 filed on Nov. 1, 1993, which issued as a U.S. Pat. No. 5,665,259 on Sep. 9, 1997.

FIELD OF THE INVENTION

This invention relates to the field of cooking method and apparatus. More particularly, this invention relates to the use of power and pulsed power applied to high-power lamps providing radiant energy in the electromagnetic spectrum including a significant portion in the near-visible and visible ranges.

BACKGROUND OF THE INVENTION

Ovens for cooking and baking food have been known and used for thousands of years. Basically, oven types can be categorized in four cooking forms; conduction cooking, convection cooking, infra-red radiation cooking and microwave radiation cooking.

There are subtle differences between cooking and baking. Cooking just requires the heating of the food. Baking of a product from a dough, such as bread, cake, crust, or pastry, requires not only heating of the product throughout but also a chemical reaction coupled with driving the water from the dough in a predetermined fashion to achieve the correct consistency of the final product and finally browning the outside. Following a recipe when baking is very important. An attempt to decrease the baking time in a conventional oven by increasing the temperature results in a damaged or destroyed product.

In general, there are problems when one wants to cook or bake foodstuffs with high-quality results in the shortest times. Conduction and convection provide the necessary quality, but both are inherently slow energy transfer methods. Long-wave infra-red radiation can provide faster heating rates, but it only heats the surface area of most foodstuffs, leaving the internal heat energy to be transferred by much slower conduction. Microwave radiation heats the foodstuff very quickly in depth, but during baking the loss of water near the surface stops the heating process before any satisfactory browning occurs. Consequently, microwave ovens cannot produce quality baked foodstuffs, such as bread.

Radiant cooking methods can be classified by the manner in which the radiation interacts with the foodstuff molecules. For example, starting with the longest wavelengths for cooking, the microwave region, most of the heating occurs because of the coupling of radiant energy into the bipolar water molecule causing it to rotate and thereby absorb energy to produce heat. Decreasing the wavelength to the long-wave infra-red regime, we find that the molecules and their component atoms resonantly absorb the energy in well-defined excitation bands. This is mainly a vibrational energy absorption process. In the near-visible and visible regions of the spectrum, the principal absorption mechanism is excitation of the electrons that couple the atoms to form the molecules. These interactions are easily discerned in the visible band of the spectra, where we identify them as "color" absorptions. Finally, in the ultraviolet, the wavelength is short enough, and the energy of the radiation is sufficient to actually remove the electrons from their component atoms, thereby creating ionized states. This short wavelength ultraviolet, while it finds uses in sterilization techniques, probably has little use in foodstuff heating, because it promotes chemical reactions and destroys food molecules.

SUMMARY OF THE INVENTION

Broadly stated, the present invention is directed to method and apparatus for cooking food in a lightwave oven having a plurality of high-power lamps providing radiant energy in the electromagnetic spectrum including a significant portion in the near-visible and visible ranges wherein irradiation is applied to the food by applying power to the lamps for a period of time and without vaporizing all of the surface water on the food and then applying reduced irradiation to the food. In accordance with this invention, thick foods can be cooked with deep penetrating visible and near-visible light radiation without producing an overly browned surface which will absorb the radiation at the surface and will reduce the amount of visible and near-visible light radiation which can penetrate deeply into the food.

In accordance with the preferred embodiment of the present invention, the reduced irradiation is produced by applying power to the lamps at a reduced duty cycle which can either be done in a sequence of one or more reducing steps in the duty cycle or a continuous reduction of the duty cycle of the power applied to the lamps.

In accordance with another aspect of the present invention the reduced radiation is produced by applying less average power to the lamps which can include a stepwise or a continuous reduction in power and possibly in conjunction with a stepwise or a continuous reduction in the duty cycle of certain or all the lamps.

Ordinarily, the radiation impinging means is one or more quartz halogen tungsten lamps or equivalent means. Typically quartz halogen tungsten lamps of this type convert electrical energy into black body radiation having a range of wavelengths from 0.4 $\mu$m to 4.5 $\mu$m with a peak intensity of approximately 1 $\mu$m. Each lamp may provide about 1 to 2 KW of radiant energy with a significant portion of the energy in the visible light spectrum. Such lamps operate at full power at a color temperature of approximately 2900° K. and produce approximately 10.6% visible light in the full visible light range of 0.39 to 0.77 $\mu$m (or 7% visible light in the reduced visible light range of 0.4 $\mu$m to 0.7 $\mu$m), which percentages are significant.

As the power to the quartz halogen tungsten lamps is reduced from full power, the color temperature of the lamps drops and the percentage of visible light radiation decreases. In a current preferred embodiment the tungsten halogen quartz lamps have a peak intensity at 0.966 $\mu$m with a color temperature of 3000° K. and with 12% of the radiation in the full visible range of 0.39 to 0.77 $\mu$m (or 8.1% in the reduced visible range of 0.4 to 0.7 $\mu$m). Applicant has achieved successful cooking and baking with the present invention with a percentage of visible light as low as 7.9% in the full visible light range of 0.39 to 0.77 $\mu$m (or 5% in the reduced visible light range of 0.4 $\mu$m to 0.7).

A feature and advantage of this invention is that water from deep within the food can migrate to the surface and prevent the surface from being heavily browned by infra-red radiation that would then inhibit deep penetration of radiation in the near-visible and visible ranges.

In accordance with another aspect of the present invention, full power is first applied to the lamps for irradiating the food without vaporizing all of the surface water from the food and thereafter power is applied to the lamps at a reduced duty cycle as the flow of water to the surface of the food decreases.

In accordance with another aspect of the preferred embodiment of the present invention, the lamps are turned off or radiation to the food eliminated periodically, preferably in between application of power to the lamps at different duty cycles whereby water is replenished from within the food onto the surface of the food.

In accordance with still another aspect of the present invention, a change in the color or the surface of the food of a given degree is sensed and irradiation of the food then terminated to allow water from within the food to reach the surface of the food.

In accordance with still another aspect of the present invention and as a final step for cooking the food, the duty cycle of the power to the lamps is increased from an operating duty cycle level for browning the food when the desired level of cooking has been accomplished deep within the food or the duty cycle can be established that allows a slow browning reaction throughout the latter portion of the cycle so that final heating and browning occur simultaneously.

By providing a sufficiently intense source of visible and near-visible radiation in conjunction with the longer infrared radiation over an extended period of time while the duty cycle of the power to the lamps is reduced, a novel and very effective cooking method and apparatus results, especially for cooking thicker foods.

The low absorption of visible and near-visible radiation allows the energy to penetrate the foodstuff and heat it deeply like microwave energy. By contrast the longer infrared radiation does not penetrate very deeply and acts as a very effective browning agent. By combining these sources of radiation into a single cooking process it is possible to produce a very rapid and highly efficient method of cooking and baking a wide variety of foodstuffs.

Using intense visible, near-visible, and infra-red radiation to cook food has a number of significant advantages. First of all, the cooking process is very fast. Bakery products, like pizza crust for example, can be baked five to ten times faster than ovens that rely on conventional convection and conduction processes only. Large, thick meat and poultry products, such as roasts and whole chickens and turkeys, can be cooked three to five times faster than by convection and conduction processes alone. Second, the quality of the cooking process is enhanced for many foodstuffs. For example, crusts become fully cooked with crispy exteriors and moist, chewy interiors. Vegetables are cooked so fast that they are virtually steamed in their own water vapor, leaving them hot, but with very little loss of any of their nutritive values. Third, the process is very energy efficient. Because the oven has reflective inner walls, a large fraction of the energy produced by the sources is used to cook the food rather than heat the oven. A pizza can be fully baked for about $0.01 of electrical energy.

Additionally, the present invention enables the fast cooking times available with microwave energy but with a more flavorful taste and a more traditional texture and surface coloring as in convection and infra-red cooking.

These and other aspects, features and advantages of the present invention will become more apparent upon a perusal of the following specification taken in conjunction with the accompanying drawings wherein similar characters of reference refer to similar items in each of the several views.

BRIEF DESCRIPTION OF THE DRAWINGS

FIG. 5A is a graph showing a power-time illustration for applying power at different duty cycles to lamps for radiating a food product with this invention.

FIGS. 6, 7 and 8 are graphs similar to FIG. 5A showing alternative embodiments of this invention.

DETAILED DESCRIPTION OF THE PREFERRED EMBODIMENT

Figure 1:
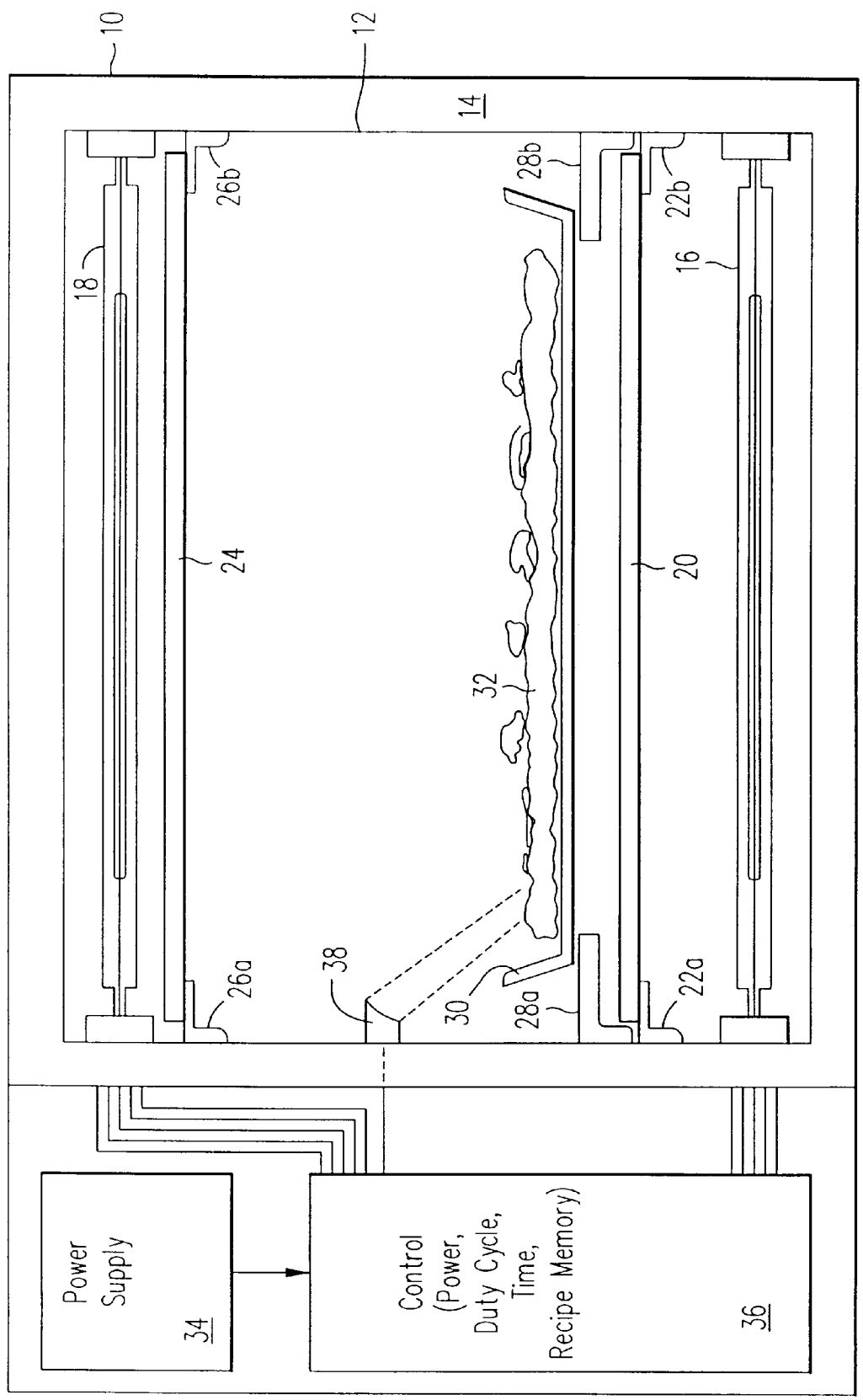
FIG. 1 shows a front cross section of a preferred embodiment of the present invention.
Figure 2:
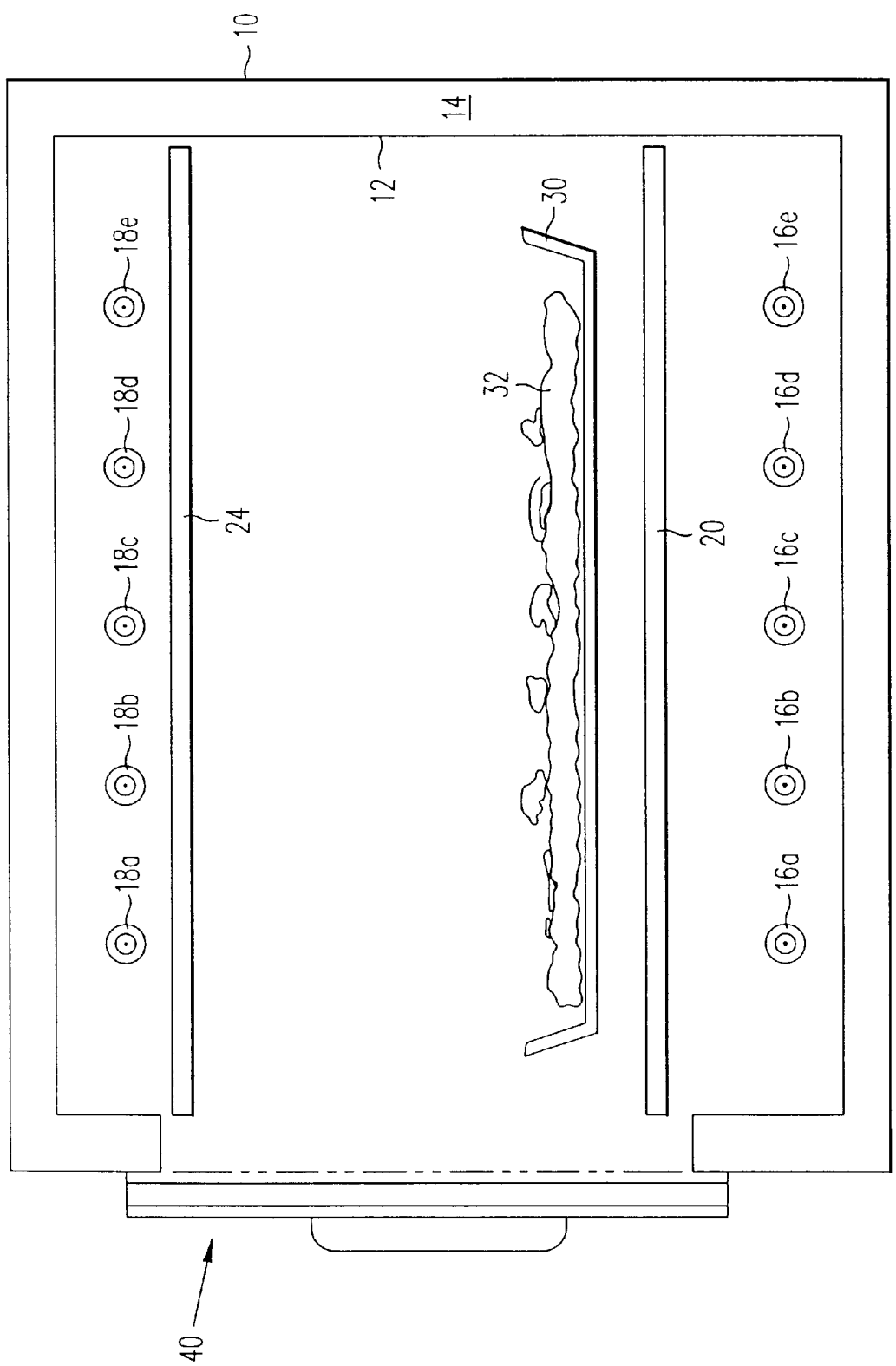
FIG. 2 shows a side cross section of the preferred embodiment of the present invention.

FIGS. 1 and 2 are front and side cross sectional views of the apparatus of a preferred embodiment of the present invention. The oven in FIG. 1 includes an outer enclosure 10. The enclosure has an inner wall 12 coupled to the outer wall 10. Ordinarily, an insulating layer 14 is formed between the outer enclosure 10 and the inner wall 12. Because of the inherent speed of the cooking cycle, the insulating layer 14 may be a layer of air.

The present invention has been used to cook pizzas reasonably continuously for an hour in an oven with only air as an insulator. While the exterior of the oven did warm up, it never became too warm to touch comfortably. This is true because the interior walls of the oven are reflective so that a large fraction of the energy is used to cook the food, not heat the oven. Second, a fan is used to pull hot air out of the oven. Though some air is heated directly by the radiation, most of the air is heated by convection from the cooked food. Because the cooking times are so short with the present invention, the hot air is removed to prevent further cooking after the radiation source is turned off.

The energy for cooking is supplied by the lower radiation heating lamps 16 and the upper radiation heating lamps 18. These lamps are generally any of the quartz body, tungsten-halogen or quartz arc lamps commercially available, e.g., 1.5 KW 208 V quartz-halogen lamps. The oven according to the preferred embodiment utilizes ten such lamps and cooks with approximately forty percent (40%) to fifty percent (50%) of the energy in the visible and near-visible light portion of the spectrum, which is significant. Quartz xenon-krypton arc lamps have been used as an alternate source in which ninety-five percent (95%) of the radiation is below 1 $\mu$m and good cooking results have been achieved with their shorter wavelengths.

There is no precise definition for the range of wavelengths for visible light because the perceptive ranges of each human eye is different. Scientific definitions typically encompass the range of 0.39 $\mu$m to 0.77 $\mu$m. An engineering shorthand for visible light specifies the range of 0.4 $\mu$m to 0.7 $\mu$m. The term "near-visible" has been coined for radiation that has wavelengths longer than the visible range, but less than the water absorption cut-off at 1.35 $\mu$m. The term "long-wave infra-red" refers to wavelengths greater than 1.35 $\mu$m.

Figure 3:
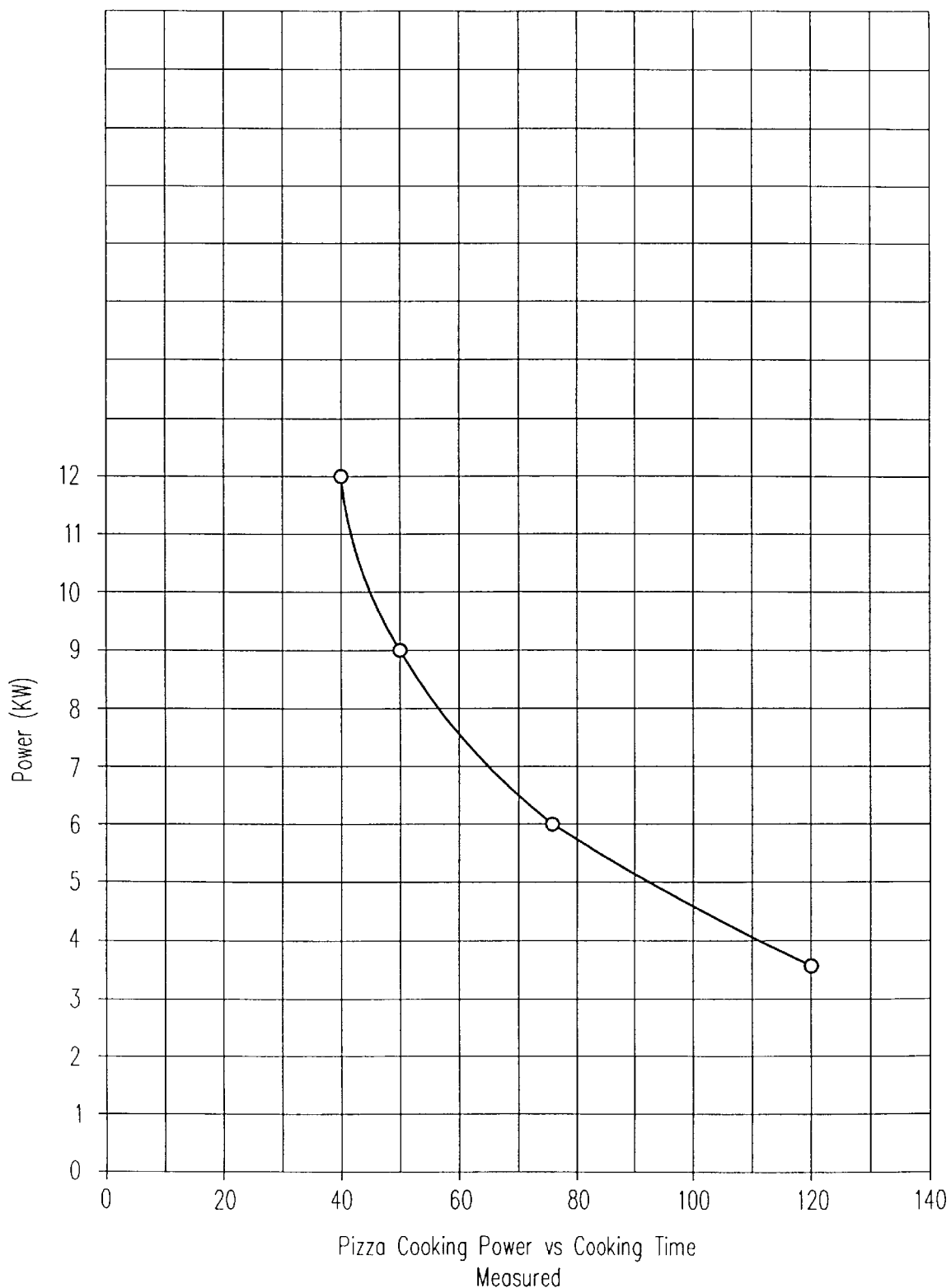
FIG. 3 is a graph showing the approximately inverse linear relationship between cooking power and cooking time.
Figure 4:
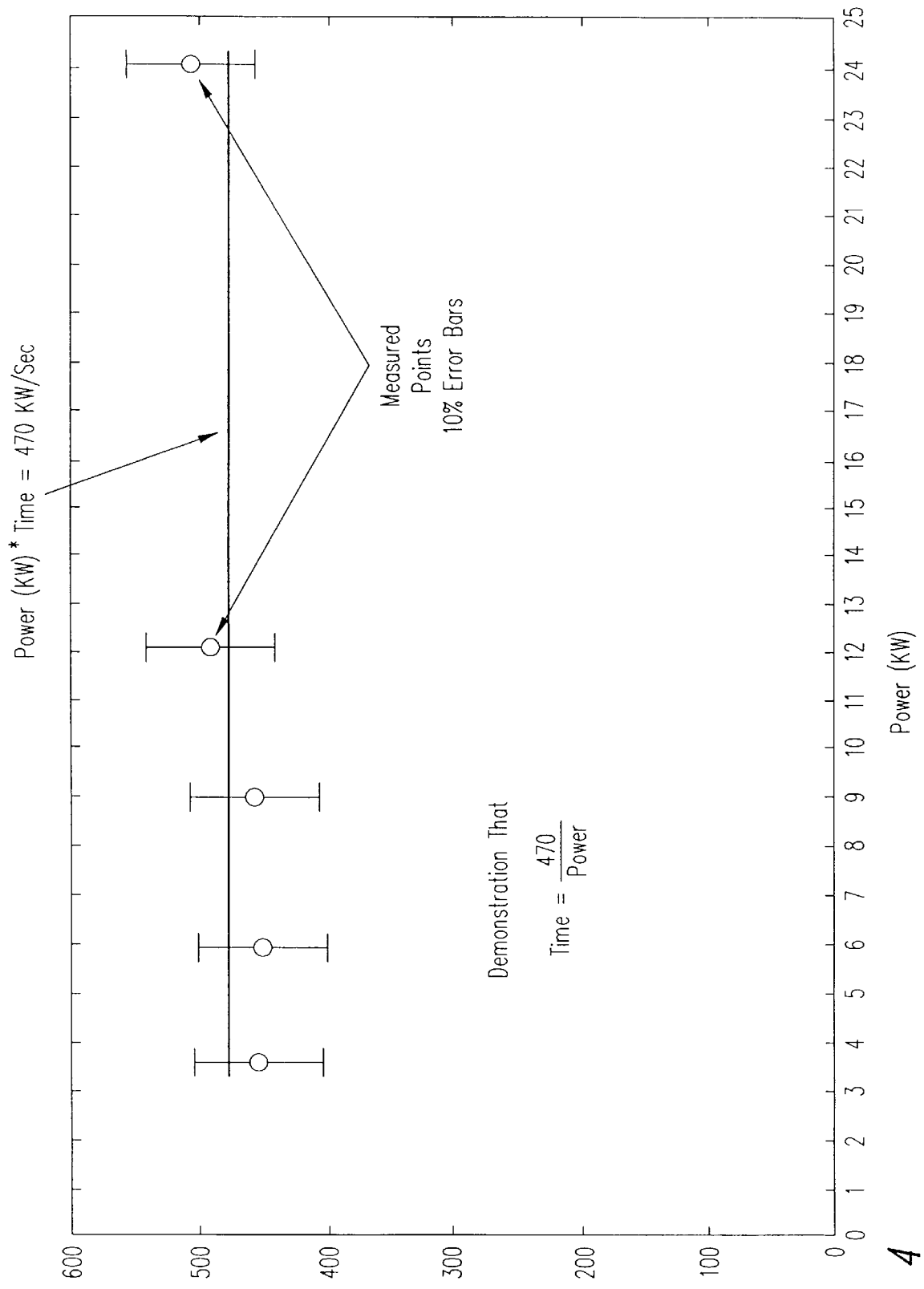
FIG. 4 is a graph showing the constant power-time product for baking a pizza in the oven of the preferred embodiment.

The inner surface of the inner wall 12 is preferably a highly reflective, poorly absorptive surface, so that it appears to be very reflective to the wide spectrum of wavelengths from the radiant lamps. Polished aluminum and stainless steel have been successfully used for the inner wall 12. Plating the inner wall 12, such as with gold, increased the efficiency of the reflector for visible light by about ten percent (10%) over the polished aluminum walls. Two radiation transparent plates 20 and 24 are used to isolate the cooking chamber from the radiant sources making the oven easier to clean as shown in FIG. 3. These plates can be formed from such materials as quartz, glass or pyroceramic that transmit visible, near-visible and infra-red radiations. The lower transparent plate 20 is supported by brackets 22*a* and 22*b* and is positioned above the lower lamps 16. The upper transparent plate 24 is supported by brackets 26*a* and 26*b* and is positioned below upper lamps 18.

Brackets 28*a* and 28*b* support a platter 30 which is positioned above the lower transparent plate 20 and below the upper glass plate 24. A food item 32 is positioned on platter 30 to be cooked.

The platter 30 may formed of a material similar to the transparent plates 20 and 24 to allow even cooking over the surface of the food item 32. However, in some circumstances it may be desirable to crisp the bottom of the food item 32. As a particular example, when cooking a pizza, it is desirable that the crust be light and crispy, rather soggy and doughy. In such an application, the cooking platter 30 can be formed of a radiation absorbing, heat conducting material, such as black anodized aluminum. In this way, the lower lights 16 would rapidly heat the platter 30 to a high temperature in order to crisp and brown the bottom of the pizza. It may also be desirable to perforate the platter 30 in order to allow steam to escape from the cooking pizza dough. Alternatively, the platter could also be a grill structure. Platter 30 should touch the support brackets 28*a* and 28*b* over very limited areas, so that the heat delivered to platter 30 is not lost by conduction.

The lamps 16 and 18 produce very high intensity visible, near visible and infra-red radiation. Prior art uses of radiant energy heat sources teach cooking using radiation in the infra-red portion of the electromagnetic spectrum. For example, see Malick U.S. Pat. No. 4,481,405 and Bassett U.S. Pat. No. 4,486,639. Burkhart, in U.S. Pat. No. 4,516,486, discloses a radiant energy cooker for the exclusive purpose of charring the surface of foods, particularly meats.

The use of high intensity visible radiation provides a very rapid method of high quality cooking and baking both alone or in combination with infra-red radiation. The radiant energy from the lamps 16 and 18 radiates from each bulb in all directions. A portion of the energy radiates directly onto the food item 32. The remainder of the energy will be reflected off the surface of the preferably metal inner wall 12 and then strike the food item 32 for more efficient cooking.

A power supply 34 provides the power for the lamps 16 and 18, the operation of which is controlled by a control circuit 36, shown as a circuit block.

It is possible to control the power level and/or duty cycle of each of the lights 16 and 18 independently with the control circuit 36. The control circuit 36, shown as a circuit block in FIG. 3, may include a microprocessor or a microcontroller and associated memory to store individual cooking recipes to control proper heating of the food product.

For example, in cooking a pizza, it may be desirable to run the upper lamps 18 at a reduced power level for a time. For a pizza having fresh vegetables, this would prevent the overcooking of the vegetables making them mushy. The lower lamps 16 might be operated at a higher power level to make the pizza crust light and crispy.

In the preferred embodiment as shown in FIG. 2, there are five lower lamps 16*a* through 16*e* and five upper lamps 18*a* though 18*e*. By appropriately selecting the lateral spacing between the lamps relative to the food, even cooking can be achieved over the entire surface. A door 40 is also shown.

Experimental results show that cooking with one 1.5 KW lamp above and one below, i.e. impinging a maximum of 3 KW of radiant energy onto a pizza, does not achieve the dramatic improvement in speed that is possible according to the present invention. The oven in the preferred embodiment includes five lamps above and five lamps below. This number provides for a maximum of 15 KW of cooking energy.

Pizza has been successfully cooked using a modification of the present invention with more powerful bulbs using total power in the range in excess of 4 KW to approximately 24 KW. There appears to be no reason preventing the power ranges in excess of 20 KW. This is a significant advantage of the present invention. Cooking times can be reduced by increasing power. The only way to increase power in a conventional oven is to increase temperature which damages the food.

While cooking a pizza using total power in excess of about 4 KW an approximately inverse linear relationship develops between time and cooking power. In other words, as the power delivered to the pizza is doubled, the time to cook a pizza is cut in half. This result is totally unexpected in view of conventional oven baking where increasing oven temperature to achieve a higher energy transfer rate results in a burnt product which may have an uncooked interior.

FIG. 3 is a graph showing the power-time product versus power for baking a pizza in the oven of the preferred embodiment. Note that in the preferred oven the power-time product is constant and has a value of about 470 KW-sec.

This cooking in the linear range of the power-time product appears to be a function of both the wavelength of radiation and the amount of power applied. Thus, the specific mechanical configuration of the oven in the preferred embodiment is not critical to the invention. Rather, it is the combination of the lamps that provides at least a significant portion of radiation in the visible and near-visible light range with total radiant power in excess of 4 KW and impinging the radiation directly onto the food item of energy which provides the dramatic speed increase of the present invention.

For example, an oven having a reflective inner surface could operate according to the present invention with a single arc lamp capable of producing sufficient power in the desired frequency ranges. In certain circumstances it may be desirable in such a single source oven to place the food product, such as a pizza, on a highly thermally conductive platter with the lamp positioned above the food item. The amount of heating to the bottom of the pizza can be regulated by heating the platter and by adjusting the ratio of the size of the pizza to the size of the pan. In other words, the amount of exposed area of the pan would control the amount of energy absorbed by the pan used to heat the bottom of the pizza.

Microwave ovens cannot be used in cooking high quality freshly prepared pizza. The commercially available frozen pizzas for microwave ovens are precooked and then frozen. The pizza is merely heated to the proper serving temperature in the microwave oven, but the result is usually unsatisfactory. A higher quality pizza can be baked in a commercial grade conduction/convection oven. There, the pizza is placed directly on the hot floor of the oven to properly crisp the bottom of the crust (up to 900° F. in a brick oven). Unfortunately, the ovens have various "hot" spots and require constant operator attention to avoid over or under cooking the pizza, i.e., consistency is a major problem. Such ovens cook a pizza in 5 to 20 minutes. Conveyorized infra-red and hot air convection ovens can cook a pizza in 5 to 15 minutes, but have great difficulty in properly crisping the bottom of the pizza.

A pizza can be cooked using the present invention in as little as 30 to 45 seconds. This speed is very important in the commercial pizza market because it enables pizza to be produced in a manner that would qualify it as a true fast-food.

The energy efficiency of the present invention is illustrated by the fact that the energy cost to cook such a pizza is about $0.01. The majority of the radiant energy produced by the oven is utilized in cooking the pizza and after the cooking process is completed the energy is turned off. In contrast, conventional commercial pizza ovens must be preheated to desired cooking temperatures. Ordinarily, the oven in a pizza restaurant is left on all day, whether cooking a pizza or not, making the energy consumption significant.

In accordance with the present invention, not only thick pizza, but most importantly, thicker and more dense foods such as steaks, roasts, chicken, turkey, etc. are advantageously cooked by time varied pulsing the amount of radiation directed onto the food substance.

With reference to FIG. 5A, the power directed to the lamps being used to cook the food in the preferred embodiment is initiated at a maximum or given level 40 for a period of time $T_1$. At this intensity radiation in the near-visible and visible light range penetrates deeply into the food. The radiation in the infra-red range which does not penetrate deeply into the food is principally responsible for browning the surface of the food which happens typically when you get to 300–400° F. Steam goes off the surface at 212° F. so as long as surface water or moisture is present browning will not occur. Browning of the surface inhibits transmission of the visible and near visible light therethrough. Therefore, for deep cooking with a lightwave oven in accordance with the present invention, it is desired to keep water on the surface or the temperature of the surface at or below 212° F. as long as possible.

In the initial cooking stage during time period $T_1$ the combination of radiation in the infra-red, near-visible and visible ranges does not vaporize all of the surface water on the food which includes water migrating to the surface of the food due to the cooking process both at the surface and deep within the food. Thus, the length of time period $T_1$ is established by experimentation or otherwise such as by sensing the temperature of the surface and/or the presence of steam and/or a color change in the surface indicative of initiation of the browning process with a sensor 38 to terminate period of time $T_1$ before all the surface water is removed from the food. Thus, the cooking process is designed so that browning on the outside is well controlled in such a way that browning of the outside surface does not occur before the inside of the food has been cooked. After time $T_1$, radiation directed to the food is eliminated for a period of time $T_2$ during which water is replenished from within the food onto the surface of the food. The elimination of radiation is preferably accomplished by turning off the power to the lamps but can also be accomplished by shielding the food from radiation from the lamps.

After the time period $T_2$ reduced radiation is applied to the food typically by reducing the duty cycle of the power to the lamps (e.g., to fifty percent (50%) duty cycle) for a period of time designated $T_3$ in FIG. 5A. In the preferred embodiment of the invention the power pulses during the reduced duty cycle $T_3$ are maintained at the same maximum or preset power level 40 for applying the near-visible and visible light to the maximum depth within the food. Reduced power produces reduced color temperature with corresponding reduced percentage of visible radiation and increased percentage of infrared radiation. Since during energization and especially during de-energization of the typical high-power lamps the percentage of infra-red radiation is the highest, periodically shielding the food from the radiation of the lamps may be preferable under certain circumstances to actually turning off the power to the lamps.

After irradiating the food at a reduced duty cycle during time period $T_3$, radiation can be eliminated from the food for a another period of time $T_4$ followed by the application of additional radiation at a second and still lower duty cycle (e.g., for a ten percent (10%) duty cycle) for a time period $T_5$. The time periods $T_1$–$T_5$ are selected so that the maximum amount of near-visible and visible radiation can pass deeply into the food without being obstructed by the effect of browning of the surface resulting from infra-red radiation applied to a surface with no surface water. The individual time periods can be determined by experimentation in the manner described below, or the time periods can be arbitrarily set based on experimentation with other foods and then used on the given food and kept or adjusted depending on the results.

Depending upon the particular food, the power level and the duty cycle, the elimination of radiation in time periods $T_2$ and $T_4$ can be dispensed with so that the time periods $T_1$, $T_3$ and $T_5$ can occur sequentially without intervening time periods $T_2$ and $T_4$.

Sensor 38 can be used to monitor the surface of the food and to signal a change in the color of the surface of the food of a given degree so as to then trigger termination of one of the time periods $T_1$, $T_3$ or $T_5$, thereby allowing replenishment of surface water from within the food.

Figure 5B:
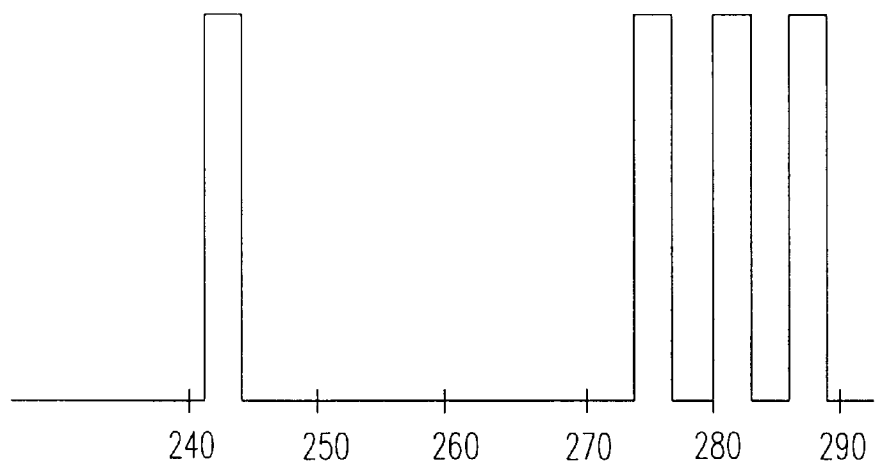
FIGS. 5B and 5C are graphs showing alternative concluding browning operations to the concluding browning operation in FIG. 5A.
Figure 5C:
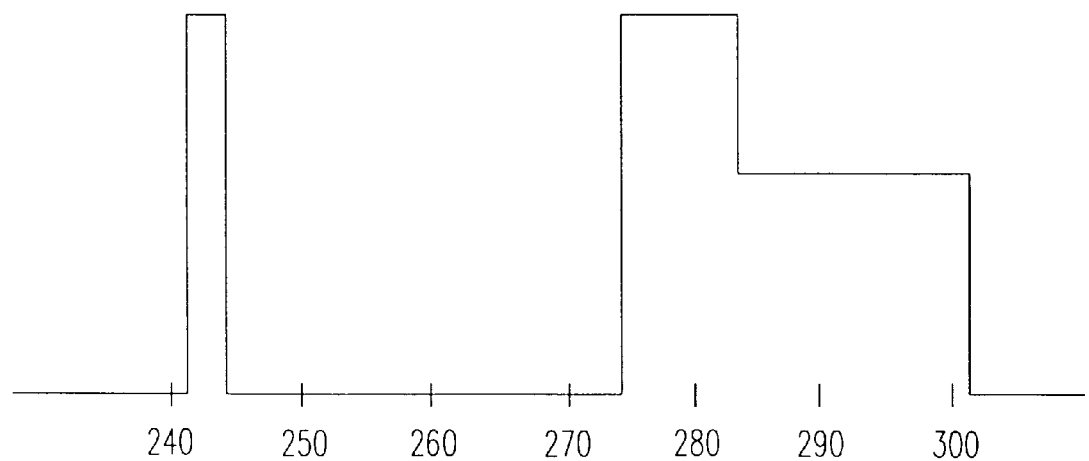

For providing a desired aesthetic brown surface and/or harder surface texture, a final period can be provided with increased radiation to the food surface for time $T_6$. During time period $T_6$, the lamps may be restored to full power as indicated in FIG. 5A or the duty cycle from time period $T_5$ can be increased to the duty cycle of time period $T_3$ or some other duty cycle 6 as shown in FIG. 5B. Alternatively, the final browning radiation period can be accomplished by application of increased power for a period of time followed by a reduction in power to the lamps without turning the lamps off as shown in FIG. 5C. This permits the oven operator to observe a more gradual browning and turn the lamps off when the desired degree of browning has been achieved. The final browning period may be limited to just the upper lamps for browning just the top surface of the food.

By way of example, experimentation for cooking with the present invention to establish a preferred cooking recipe for a given food can proceed as follows. You take an example of the food made up of the specified ingredients, such as for a muffin, and you place that food in the oven and turn on the lamps at full power for a first very long time period $T_1$ which is much longer than it typically will take and watch the cooking process to observe when the surface begins to brown. In the case of a muffin cooked with a lightwave oven of this invention, usually by 30 seconds you see that the surface is starting to brown. You then provide a safety factor by subtracting a number of seconds, for example five seconds, from the time at which browning was first noticed to establish the first time period $T_1$ for the muffin cooking recipe. You then put another muffin in the oven and follow the cooking cycle with $T_1$ equal to 25 seconds and then a prolonged reduced duty cycle (i.e., fifty percent (50%)) for a prolonged time period $T_3$. When you observe the muffin starting to brown during time period $T_3$, you stop the cooking cycle and subtract a number of seconds, for example five, from the shortened time period $T_3$ and then proceed with a third muffin to determine the time period $T_5$ until a muffin properly cooked and properly browned is achieved. Then this final cooking recipe of selected times $T_1$, $T_3$ and $T_5$ is utilized and can be adjusted if needed. As set forth above, the termination of each of the time periods $T_1$, $T_3$ and $T_5$ in the foregoing experiment can be selected using an optical sensor to sense a given change in the color of the surface of the food or other parameters such as the temperature of the muffin surface and/or the decrease or an absence of steam in the oven.

As an alternative to the step-wise reduction of the duty cycle from full duty cycle during $T_1$ to a first reduced level of duty cycle during $T_3$ and to a second further reduced duty cycle during $T_5$, the duty cycle can be continuously reduced over a given period of time as shown in FIG. 6 wherein the duty cycle is shown as decreased from one hundred percent (100%) to seventy percent (70%) to fifty percent (50%) to forty percent (40%) to thirty percent (30%) to twenty percent (20%) to ten percent (10%). Typically, the decreases in the duty cycle will be in smaller increments.

The present invention allows the chef to set up recipes or the manufacturer to program recipes in which the intensity is independently set with different duty cycles and the spectrum of irradiation from the lamps independently set by selecting different power levels and those different settings can be changed periodically through the cooking cycle to achieve unique recipes for cooking special foods.

FIGS. 5–8 can be considered as either a graph of the power versus time for all of the lamps or the power versus time for a single lamp, and since the lamps can be controlled independently different lamps can be on at different times and following different power levels to control the spectrum and different duty cycles to control the intensity at different times during the cooking process.

In a preferred embodiment of the present invention, applicable to cooking many different types of food such as thin and thick steaks, roasts, chickens, turkeys and other poultry, bread products, cakes, cookies and even frozen products, a fifty percent (50%) duty cycle is utilized during time period $T_3$, such as the lamps being on for three seconds and off for three seconds, and then the duty cycle reduced to 10:1 for the second lower reduced duty cycle during time $T_5$ such as with the lamps on for one second and off for ten seconds.

The following examples show the timing for cooking various different types of foods with maximum power indicated as one hundred percent (100%) intensity in each case:

| Period | Time | Duty Cycle |
| --- | --- | --- |
| 1. Carrot Cake-100% Intensity | | |
| $T_1$ | 11 sec. | on full |
| $T_2$ | 3 sec. | |

-continued

| Period | Time | Duty Cycle |
| --- | --- | --- |
| $T_3$ | 16 sec. | 3 sec. on/3 sec. off |
| $T_4$ | 15 sec. | |
| $T_5$ | 220 sec. | 1 sec. on/10 sec. off |
| $T_6$ | 0 sec. | |
| 2. Cinnamon Rolls-100% Intensity | | |
| $T_1$ | 20 sec. | on full |
| $T_2$ | 0 sec. | |
| $T_3$ | 30 sec. | 3 sec. on/3 sec. off |
| $T_4$ | 0 sec. | |
| $T_5$ | 190 sec. | 1 sec. on/6 sec. off |
| $T_6$ | 0 sec. | |
| 3. Turkey (9 pounds)-100% Intensity | | |
| $T_1$ | 165 sec. | on full |
| $T_2$ | 0 sec. | |
| $T_3$ | 160 sec. | 3 sec. on/3 sec. off |
| $T_4$ | 0 sec. | |
| $T_5$ | 960 sec. | 1 sec. on/3 sec. off |
| $T_6$ | 0 sec. | |
| $T_7$ | 480 sec. | 1 sec. on/6 sec. off |
| $T_8$ | 0 sec. | |

While for maximum penetration into thick foods, full power is preferably applied to the lamps during the initial continuous power period $T_1$ and during the reduced duty cycles, $T_3$ and $T_5$, there may be certain types of foods where the desired cooking of the food itself or specifically one surface thereof is cooked using less than full power to certain or all of the lamps. Thus, the amount of radiation directed onto the food can be reduced during a given period such as by not applying full power to certain or all of the lamps or a lower power level can be applied to the lamps during a reduced duty cycle.

Figure 7:
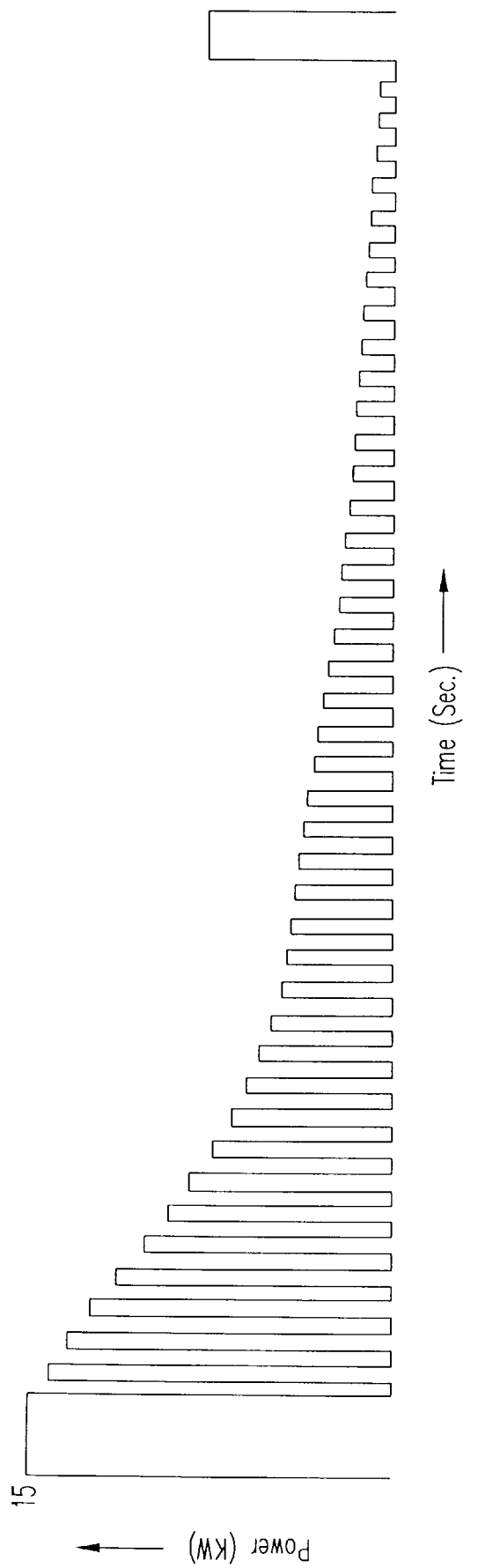

For example, FIG. 7 illustrates a continuously reduced power at a fifty percent (50%) duty cycle from an initial time period $T_1$ of full power.

Figure 8:
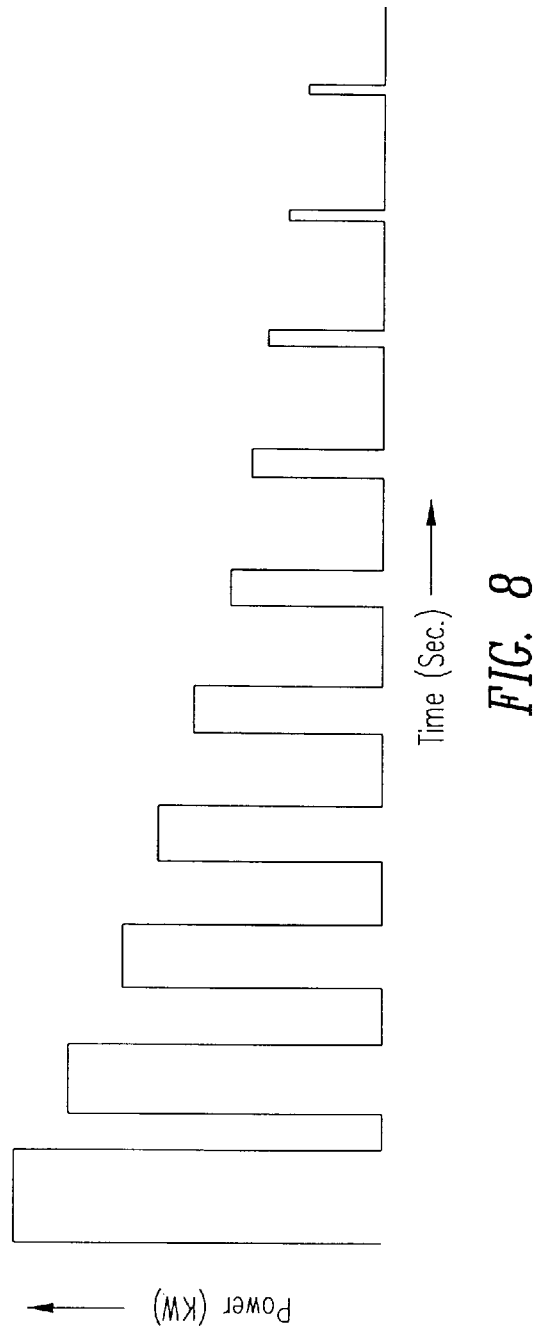

FIG. 8 illustrates a cooking recipe where both the power and the duty cycle are reduced following an initial cooking period $T_1$ of full power at one hundred percent (100%) duty cycle.

Figure 9:
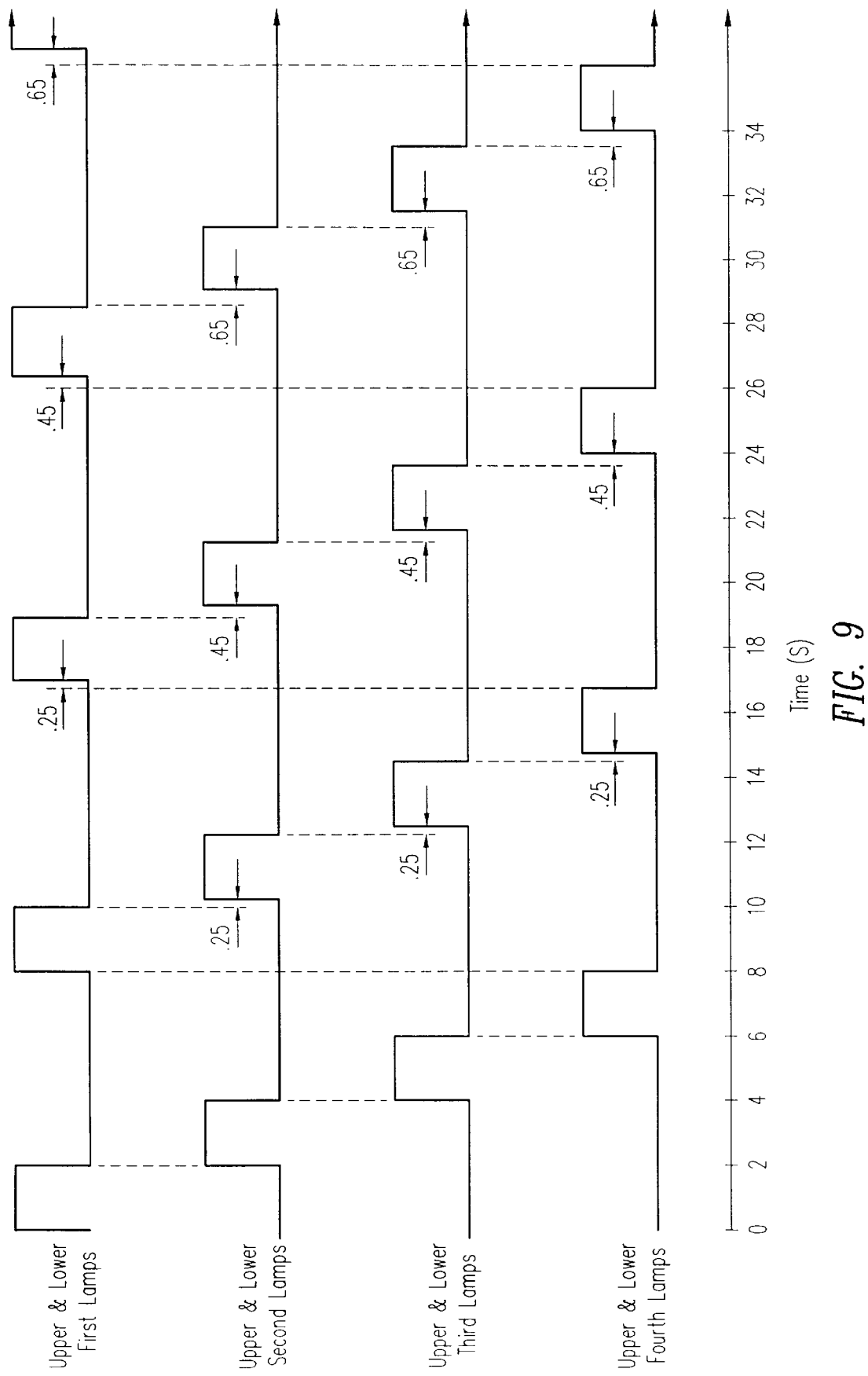
FIG. 9 is a graph similar to FIG. 5A showing the sequential lamp operating mode of the present invention.

A sequential lamp operating mode of the oven is now described. Different selected lamps from above and below the food can be sequentially switched on and off at different times to provide time-averaged uniform radiation to the food at changed duty cycles without having the lamps that are on at any given time exceeding a given maximum power. In one such embodiment of the present invention, four lamps are positioned above and four lamps are positioned below the food, all the lamps being of the same given power rating for sequential operation with only one lamp above and one lamp below operating at a given time. A first lamp above and a first lamp below the food are initially turned on without the total operating power exceeding twice the operating power of each of the lamps. Each of these two first lamps are maintained on for a given period of time, such as two seconds, and are turned off at the same time the second upper and the second lower lamps are turned on. The second upper and second lower lamps are on for two seconds and are turned off at the same time the third upper and third lower lamps are turned on, to be followed in sequence by the forth upper and forth lower lamps. After all the lamps have been cycled on and then off for one or more cycles, the overall duty cycle of the oven can be decreased by inducing a time delay between when one set of lamps are shut off and the next consecutive lamps are turned on. For example, the first upper and first lower lamps are turned on for 2 seconds and then off, and 0.2 seconds pass before the second upper and second lower lamps are turned on for two seconds and then off, and another 0.2 seconds pass before the third upper and third lower lamps are turned on, and so on with the fourth upper and the fourth lower lamps, for one or more cycles. Then the lamps are again cycled on and off in a similar manner, but with each set of lamps turned on for 2 seconds followed by 0.4 seconds passing before the next consecutive lamps being turned on. This procedure is followed whereby the off time between consecutive lamps increases until the total on time for each set of lamps is two seconds and the total off time between consecutive lamp sets is 2 seconds, thus producing a fifty percent duty cycle. This sequential lamp operation with decreasing duty cycle is illustrated in FIG. 9.

It is advantageous to have at least one of the lamps on at all times so the user can continuously view the cooking food. Therefore, the on/off cycles of the upper and lower lamps can be staggered so that at least one lamp is on at all times for overall duty cycles as low as 50%.

The oven of the present invention may also be used cooperatively with other cooking sources. For example, the oven of the present invention may include a microwave radiation source. Such an oven would be ideal for cooking a thick highly absorbing food item such as a roast beef. The microwave radiation would be used to cook the interior portions of the meat and the infra-red and visible light radiation of the present invention would cook the outer portions. Further, the oven according to the present invention could be used with a convection oven or with both convection oven and microwave oven cooking sources.

The present invention was described in relation to a preferred embodiment. However, it will be apparent to one skilled in the art that one can change the parameters and still practice an invention within the spirit and scope of the present invention.

What is claimed is:

1. The method of cooking food in a lightwave oven having a plurality of high power lamps positioned above the food and a plurality of high power lamps positioned below the food providing radiant energy in the electromagnetic spectrum including the infra-red, near-visible and visible ranges comprising the steps of:
    irradiating the food by applying power to at least one of said lamps above the food and at least one of said lamps below the food without vaporizing all the surface water on the food for avoiding browning of the surface thereby enabling deep penetration of the food by radiation in the near-visible and visible ranges, and
    applying power to at least an other of said lamps above the food and an other of said lamps below the food.

2. The method of claim 1 including the step of reducing the power to said one lamp above the food and said one lamp below the food when applying power to said other lamp above the food and said other lamp below the food.

3. The method of claim 2 wherein the power to said one lamp above the food and to said one lamp below the food is turned off when the power is applied to said other lamp above the food and to said other lamp below the food.

4. The method of claim 3 wherein the total power being applied to the lamps above the food and below the food is always maintained below a given power.

5. The method of claim 2 including the steps of sequentially applying power to all of the lamps above the food and sequentially applying power to all of the lamps below the food.

6. The method of claim 5 wherein the total power being applied to the lamps above the food and below the food is always maintained below a given power.

7. The method of claim 1 including the step of applying microwave radiation to the food in the oven during at least a portion of the cooking cycle.

8. The method of cooking food in a lightwave oven having a plurality of high power lamps positioned above the food and a plurality of high power lamps positioned below the food providing radiant energy in the electromagnetic spectrum including the infra-red, near-visible and visible ranges comprising the steps of:
    irradiating the food by applying power to at least one of said lamps above the food and at least one of said lamps below the food without vaporizing all the surface water on the food for avoiding browning of the surface thereby enabling deep penetration of the food by radiation in the near-visible and visible ranges,
    applying power to at least an other of said lamps above the food and another of said lamps below the food,
    turning off the power to said one lamp above the food and to said one lamp below the food when the power is applied to said other lamp above the food and to said other lamp below the food, and
    sequentially applying power to all of the lamps above the food and with substantial power being applied to only a single lamp above the food at a time and sequentially applying power to all of the lamps below the food and with substantial power being applied to only a single lamp below the food at a time.

9. The method of claim 8 wherein the total power being applied to the lamps above the food and below the food is always maintained below a given power.

10. The method of cooking food in a lightwave oven having a plurality of high power lamps positioned above the food and a plurality of high power lamps positioned below the food providing radiant energy in the electromagnetic spectrum including the infra-red, near-visible and visible ranges comprising the steps of:
    irradiating the food by applying power to at least one of said lamps above the food and at least one of said lamps below the food without vaporizing all the surface water on the food for avoiding browning of the surface thereby enabling deep penetration of the food by radiation in the near-visible and visible ranges,
    applying power to at least an other of said lamps above the food and an other of said lamps below the food,
    reducing the power to said one lamp above the food and said one lamp below the food when applying power to said other lamp above the food and said other lamp below the food, and
    sequentially applying power to all of the lamps above the food and with substantial power being applied to only a single lamp above the food at a time and sequentially applying power to all of the lamps below the food and with substantial power being applied to only a single lamp below the food at a time.

11. The method of claim 10 wherein the total power being applied to the lamps above the food and below the food is always maintained below a given power.

12. The method of cooking food in a lightwave oven having a plurality of high power lamps positioned above the food and a plurality of high power lamps positioned below the food providing radiant energy in the electromagnetic spectrum including the infra-red, near-visible and visible ranges comprising the steps of:
    irradiating the food by applying power to at least one of said lamps above the food and at least one of said lamps below the food,
    applying power to at least an other of said lamps above the food and an other of said lamps below the food, reducing the power to said one lamp above the food and said one lamp below the food when applying power to said other lamp above the food and said other lamp below the food, and sequentially applying power to all of the lamps above the food and with substantial power being applied to only a single lamp above the food at a time and sequentially applying power to all of the lamps below the food and with substantial power being applied to only a single lamp below the food at a time.

13. The method of claim 12 wherein the total power being applied to the lamps above the food and below the food is always maintained below a given power.

* * * * *